United States Patent
Schröder et al.

(10) Patent No.: US 6,678,222 B1
(45) Date of Patent: Jan. 13, 2004

(54) APPARATUS FOR READING FROM OR WRITING TO OPTICAL RECORDING MEDIA HAVING A TILTING-COMPENSATION DEVICE

(75) Inventors: Heinz-Jörg Schröder, Villingen-Schwenningen (DE); Lieu Kim Dang, Feldkirch (AT)

(73) Assignee: Thomson Licensing, S.A., Boulogne Cedex (FR)

( * ) Notice: Subject to any disclaimer, the term of this patent is extended or adjusted under 35 U.S.C. 154(b) by 0 days.

(21) Appl. No.: 09/560,880

(22) Filed: Apr. 26, 2000

(30) Foreign Application Priority Data

Apr. 26, 1999 (DE) .......................... 199 18 801

(51) Int. Cl.$^7$ ................................. G11B 7/00
(52) U.S. Cl. ................... 369/44.32; 369/53.19
(58) Field of Search .................. 369/44.11, 44.14, 369/44.17, 44.18, 44.32, 53.12, 53.14, 53.18, 53.19, 53.4, 47.36, 47.38, 47.4, 47.44, 53.23, 53.28

(56) References Cited

U.S. PATENT DOCUMENTS

| | | | |
|---|---|---|---|
| 5,001,690 A | 3/1991 | Kamiya et al. | 369/44.32 |
| 5,206,848 A * | 4/1993 | Kusano et al. | 369/44.41 |
| 5,408,320 A * | 4/1995 | Katagiri et al. | 356/490 |
| 5,442,615 A | 8/1995 | Ohsato et al. | 369/100 |
| 5,523,989 A | 6/1996 | Ishibashi et al. | 369/44.32 |
| 5,726,436 A * | 3/1998 | Oka et al. | 369/44.23 |
| 5,751,680 A | 5/1998 | Ishibashi et al. | 369/109 |
| 6,128,258 A * | 10/2000 | Kimura et al. | 369/44.32 |
| 6,160,772 A * | 12/2000 | Muramatsu | 369/44.32 |
| 6,418,096 B1 * | 7/2002 | Kahlman et al. | 369/44.32 |

FOREIGN PATENT DOCUMENTS

| | | | |
|---|---|---|---|
| DE | 4211213 A1 | 10/1993 | G11B/7/09 |
| EP | 0 351 953 A2 | 1/1990 | G11B/7/095 |
| EP | 0886266 A2 | 12/1998 | G11B/7/007 |

OTHER PUBLICATIONS

Patent Abstracts of Japan, vol. 1996, No. 9, Sep. 30, 1996, & JP08 115528A, abstract.
European Search Report citing the above–listed references: AA, AM, AN and AR.

* cited by examiner

Primary Examiner—Thang V. Tran
Assistant Examiner—Bach Vuong
(74) Attorney, Agent, or Firm—Joseph S. Tripoli; Carlos M. Herrera; Patricia A. Verlangieri

(57) ABSTRACT

The present invention relates to an apparatus for reading from and/or writing to optical recording media with optical scanner, light source, focusing means, tilting-detection device and tilting-compensation device. The object of the invention is to propose an apparatus and a method, which enables optimum compensation of tilting using as few apparatus functions as possible. This is achieved according to the invention by using a tilting-detection device comprising an optical grating, a detector element, a control device for controlling light source and the focusing means and a control device controlling for the tilting-compensation device.

14 Claims, 2 Drawing Sheets

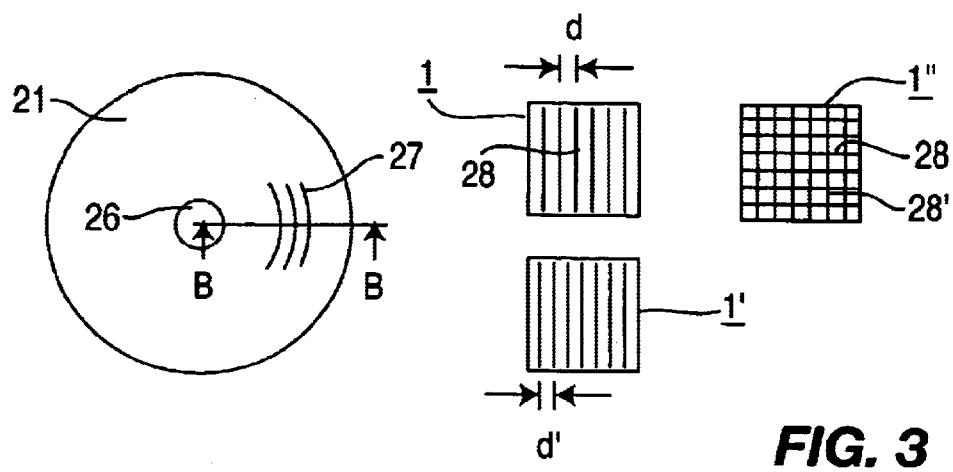
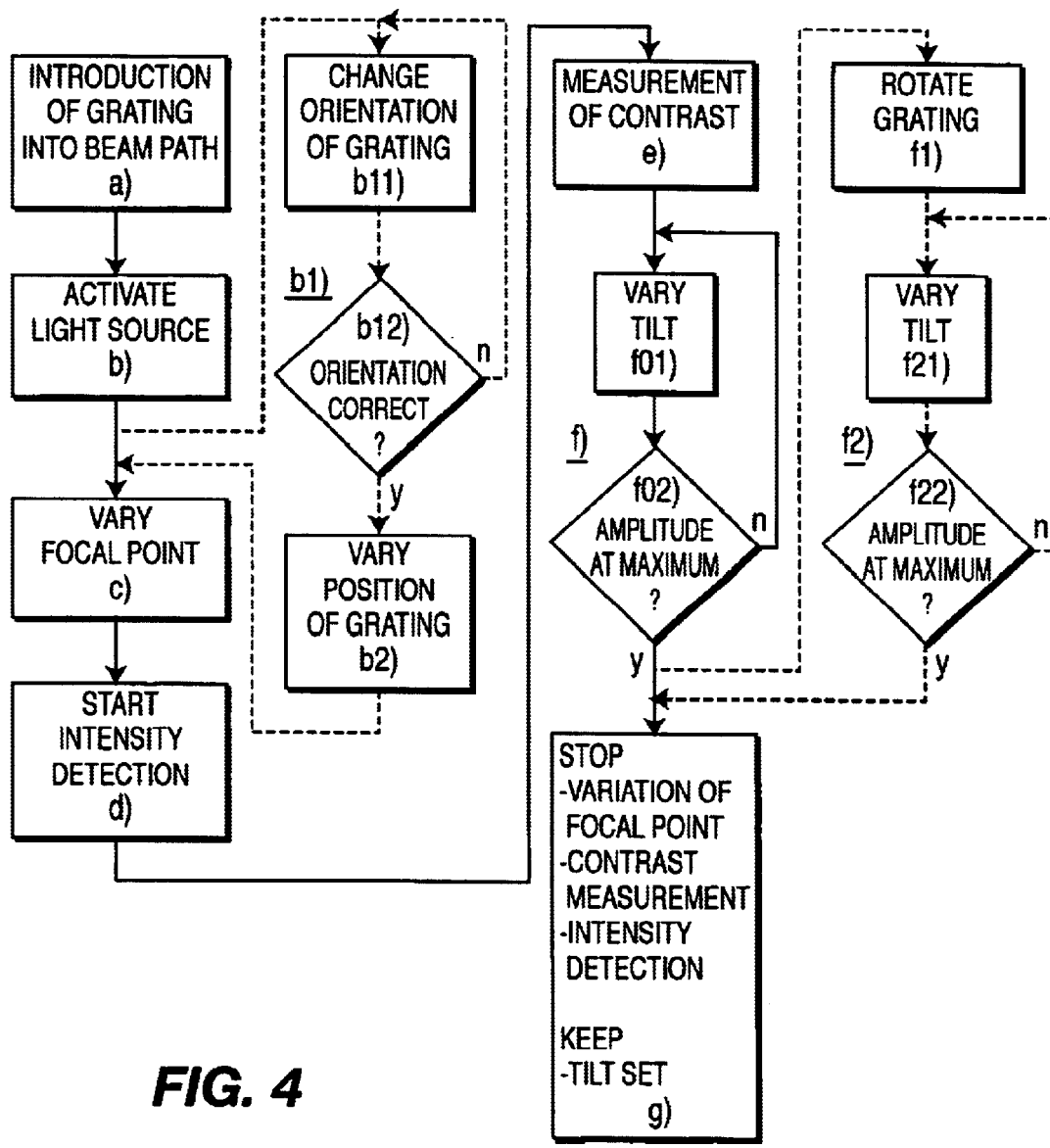
FIG. 3
FIG. 4

APPARATUS FOR READING FROM OR WRITING TO OPTICAL RECORDING MEDIA HAVING A TILTING-COMPENSATION DEVICE

FIELD OF THE INVENTION

The present invention relates to an apparatus for reading from and/or writing to optical recording media which has a tilting-compensation device, and to a method for compensating for tilting.

BACKGROUND OF THE INVENTION

An apparatus of this type has an optical scanner having a light source for generating a light pencil for scanning a recording medium, and a focusing means for focusing the light beam generated by the light source onto the recording medium. In apparatuses of this type, the situation arises where the focusing means exhibits tilting with respect to the optical axis of the light beam. Other optical elements of the scanner may also exhibit tilting. In order to compensate for tilting of this type, some apparatuses have a tilting-detection device and a tilting-compensation device, with the aid of which the tilting of the focusing means and/or of other optical elements is compensated for. The compensation of the tilting has the effect of reducing the error rate when reading from and/or writing to the optical recording medium.

An apparatus of this type with a tilting-compensation device is disclosed in U.S. Pat. No. 5,034,939. In this apparatus, the error rate of a data signal read from the recording medium is utilized for the purpose of compensating for tilting. In this case, a minimum error rate corresponds to optimum correction of tilting.

This known apparatus may be regarded as having the disadvantage that, in order to be able to carry out compensation of tilting, first of all a recording medium has to be read. This has the disadvantage that erroneously read data occur with increased frequency until the compensation of the tilting has been concluded, and this has an adverse effect for example on the reproduction of the data. Under certain circumstances, a relatively large degree of tilting means that it is not even possible to read from the recording medium in the first place. A further disadvantage may be seen in the fact that all the functions of the apparatus which are required for playback or reproduction of the recording medium are necessary for compensating for tilting. Therefore, the known method is also less suitable for tilting compensation that is to be carried out during the production process.

SUMMARY OF THE INVENTION

The object of the present invention is to propose an apparatus and a corresponding method which enables optimum compensation of tilting using as few apparatus functions as possible.

This object is achieved according to the invention, in an apparatus for reading from and/or writing to optical recording media, by virtue of the fact that the tilting-detection device has an optical grating which can be introduced into the beam path of the light source at the location of the recording medium, a detector element, a control device for switching on the light source and for moving the focusing means, and a control device for evaluating the signal of the detector element and for driving the tilting-compensation device for the purpose of varying and minimizing the tilting.

This has the advantage that the apparatus according to the invention is able to implement compensation of tilting even without the presence of an optical recording medium and/or without tracking along the tracks of such a recording medium, with just a small number of necessary elements. Merely the contrast of the light coming from the grating is evaluated in this case in the focused state and in the defocused state. By way of example, the compensation of tilting for the apparatus according to the invention is possible as early as during the production of the said apparatus, the functionality of light source and focusing means being all that is required. In an advantageous manner, their functionality is tested at the same time as the compensation of tilting or with little time between them, for example in a test cycle. However, it is possible to set the compensation of tilting permanently, that is to say to dispense with later variation of the compensation of tilting. Another possibility is to carry out compensation of tilting for example during the operation of the apparatus, after the insertion of a new recording medium, before focusing has even been effected. This compensation of tilting is advantageously effected in a manner such that it is coupled with the focusing operation or other setting operations to be carried out before the actual read-out or writing mode is reached. The optical grating is advantageously a separate element, but it may also be formed by the recording medium. According to the invention, the detector element may be arranged both in the transmission position and in the reflection position with respect to the optical grating. It is advantageously a cost-effective detector of simple construction whose detector area can be designed to be relatively large. According to another advantageous variant, the detector element is a detector element which is arranged on the scanner and, during operation, is designed for example for reading out the data or as part of a regulating circuit.

According to the invention, the apparatus has a positioning device for positioning the optical grating parallel to a reference area of the apparatus. This has the advantage that the grating can be ideally positioned by means of the positioning device, with the result that the derived compensation of tilting leads to minimum tilting. The reference area is advantageously formed by guide elements of the scanner which enable the latter to be displaced radially with respect to the recording medium. If the grating is formed by the recording medium itself, then the positioning device is advantageously integrated in the customary holding mechanism for the recording medium. If a separate component is used as the grating, both the use of a separate positioning device and a positioning device which is coupled to the holding mechanism for the recording medium or is integrated therein are advantageously possible.

The apparatus according to the invention advantageously has a drive device for moving the optical grating parallel to one reference area of the apparatus. This has the advantage of ensuring that light coming from the grating can always be detected since an unfavourable relative position of grating and light source with respect to one another, which can occur randomly, is changed by the movement of the optical grating. A reciprocating movement of the grating with a small excursion is preferably provided in this case. As an alternative to this, it is provided that the focusing means and/or the scanner are moved relative to the optical grating. This also precludes the situation where grating and light source are in an unfavourable position relative to one another. In this case, use is preferably made of a drive which is present in any case for scanner and/or focusing means.

According to the invention, the optical grating has optical properties corresponding to the optical recording medium, such as thickness, refractive index, line width, line spacing or the like. This has the advantage that corruption of the measurement result and hence of the correction of tilting on account of different optical properties does not occur. In the case of an apparatus which is able to read from and/or write to recording media having greatly different optical properties, it is advantageous to use different gratings with corresponding properties.

The grating constant d of the optical grating, the wavelength $\lambda$ of the light source and the numerical aperture NA of the focusing means are advantageously related to one another in the relationship $d=k*\lambda/NA$, where the proportionality factor k assumes a value of $k=1,2\pm10\%$. This has the advantage that the contrast between focused and non-focused states is greatest for this ratio, as a result of which the best possible compensation of tilting can be obtained. It is understood that deviations which are larger than those specified also lie within the scope of the invention, in which case, however, the requirements made of detector and/or evaluation device for the detection signal are then increased.

A method, according to the invention, for compensating for tilting is specified in the independent method claim. The method according to the invention has the advantage that merely the function of light source and focusing means is necessary, yet optimum compensation of tilting is nevertheless made possible. The order of the individual steps of the method can be modified without departing from the scope of the invention.

The invention provides for the grating to be oriented in the normal plane to the desired direction of the optical axis. This has the advantage that the compensation of tilting is optimized by optimum orientation.

The variation, provided according to the invention, of the position of the grating in the grating plane in a direction crossing the grating lines has the advantage of avoiding an unfavourable position—which may occur randomly—of the grating relative to the light pencil generated by the light source. In this case, too, it is advantageously possible to correspondingly change the relative position of grating and light source and/or of grating and focusing means.

According to the invention, provision is made, after an initial variation of the tilting, for rotating the grating and for varying the tilting again. In this case, each rotation by an angle greater than zero is expedient; it is advantageous to effect the rotation by an angle of 90°. The influence, on the detected signal, of tilting that cannot yet be compensated for in the course of the first variation process is at a maximum in this orientation of the grating; optimum compensation of tilting is thus possible. When a two-dimensional grating is used, it is also expedient to rotate the grating for the purpose of redundancy checking, in which case a value for the angle of rotation which lies between zero and 90° is then advantageously used.

It is understood that the invention is not restricted to the features described, but also includes developments within the abilities of a person skilled in the art. Advantageous refinements of the invention are contained in the following description of preferred exemplary embodiments.

BRIEF DESCRIPTION OF THE DRAWINGS

FIG. 3 shows a recording medium and various gratings used in an apparatus according to the invention;

FIG. 4 shows a flow chart of a method according to the invention.

DETAILED DESCRIPTION OF PREFERRED EMBODIMENTS

Figure 1:
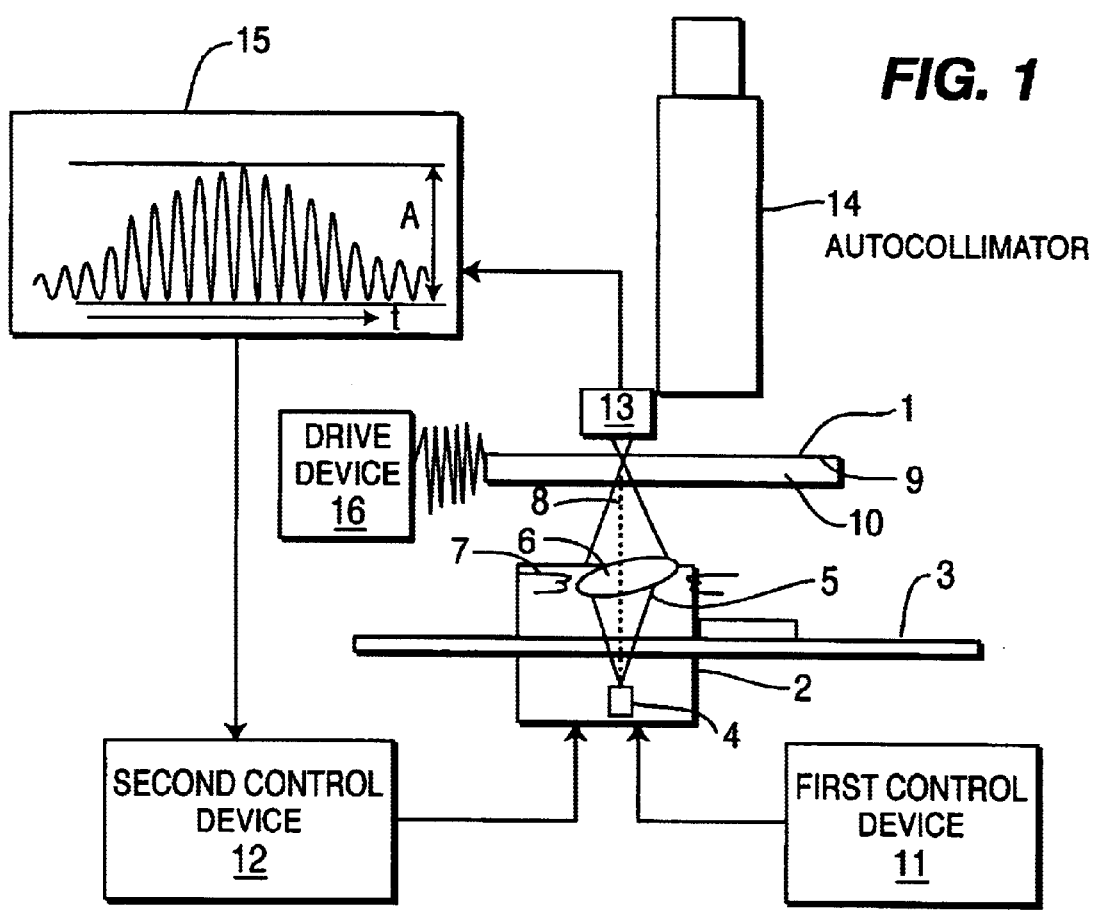
FIG. 1 shows an apparatus according to the invention with a grating in the transmission position.

FIG. 1 shows a diagrammatic illustration of an apparatus according to the invention with a grating 1 in the transmission position. The scanner 2 of the apparatus can be moved along a guide shank 3. The guide shank 3 and a further guide shank (not illustrated here) define a reference plane lying parallel to the plane of the recording medium (not illustrated here). The scanner 2 has a light source 4, which generates a pencil 5 of rays which is focused onto a plane of the grating 1 by a focusing means 6. In this case, the focusing means 6 is illustrated diagrammatically as a lens exhibiting an exaggerated degree of tilting. A tilting-compensation device 7 is indicated diagrammatically by coils arranged on both sides of the focusing means 6. These coils interact with magnetic elements (not illustrated here) connected to the focusing means 6, in order to eliminate the tilting of the focusing means 6. Other tilting-compensation devices 7, for example ones which act mechanically, can also advantageously be used. Optimum orientation of the focusing means 6 is achieved when it is oriented perpendicularly to the optical axis 8 of the pencil 5 of rays. The pencil 5 of rays is focused onto the grating plane 9 of the grating 1 by the focusing means 6. In the process, the pencil 5 of rays first of all passes through a covering layer 10 of the grating 1. The thickness and refractive index of this covering layer correspond to those of an optical recording medium which can be read from and/or written to by means of the apparatus according to the invention. The grating plane 9 also has corresponding properties of the information carrier plane of a recording medium of this type.

A first control device 11 serves for driving light source 4 and focusing means 6. A second control device 12 serves for driving the tilting-compensation device 7. In order to compensate for tilting, first of all the light source 4 is switched on, and the focusing means 6 is made to effect a reciprocating movement along the optical axis 8. In this case, the focal point of the pencil 5 of rays oscillates between a position above the grating plane 9 and a position below the grating plane 9. Therefore, a focused state and a non-focused state occur alternately. After passing through the grating 1, the pencil 5 of rays falls onto a detector element 13, which is part of a so-called autocollimator 14. The output signal of the detector element 13 is indicated diagrammatically plotted against the time t in the window 15 and is fed as input signal to the second control device 12. The second control device 12 evaluates the modulation amplitude A and causes the tilting-compensation device 7 to change the tilting of the focusing means 6. The setting of the tilting is ended when the modulation amplitude A assumes a maximum value.

The autocollimator 14 serves, inter alia, as a positioning device for positioning the grating 1 parallel to the reference area of the apparatus defined by the guide shank 3. The detector element 13 is of relatively simple design since it only has to detect intensity fluctuations, but not the precise position or the precise form of the pencil 5 of rays. A drive device 16 for moving the optical grating 1 parallel to the reference area of the apparatus is indicated diagrammatically.

Figure 2:
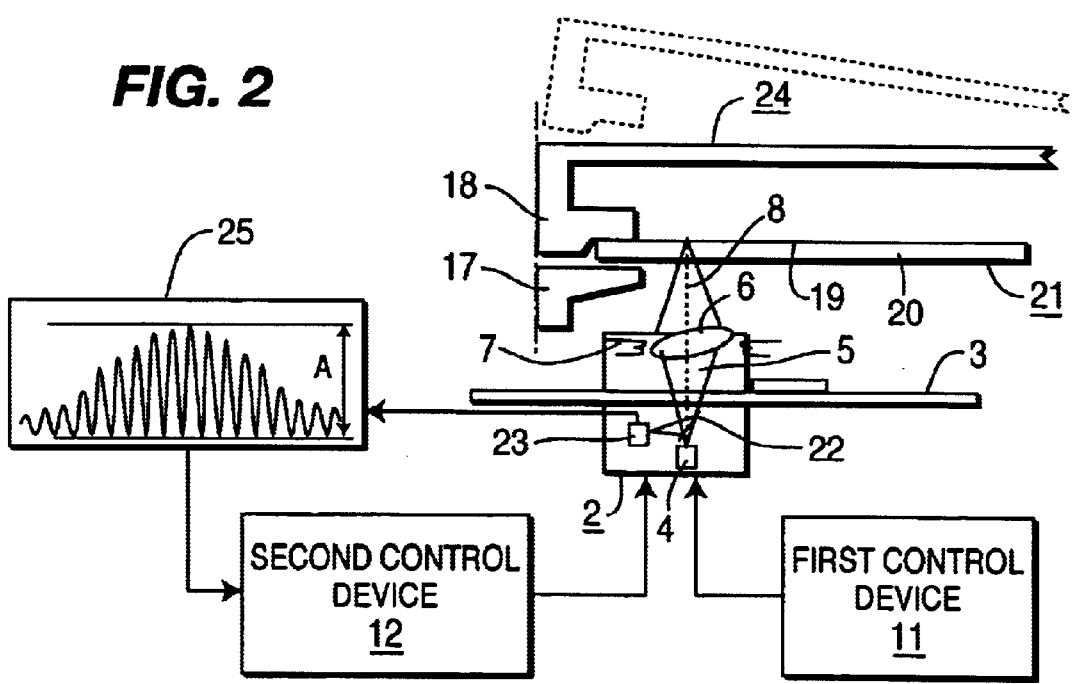
FIG. 2 shows an apparatus according to the invention with a grating in the reflection position.

FIG. 2 shows an apparatus according to the invention with a grating in the reflection position. In this case, the grating is formed by a recording medium 21 having a covering layer 20 and an information carrier plane 19. In this case, the optical properties of the covering layer 20 and of the information carrier plane 19 correspond to those of the covering layer 10 and of the grating plane 9 of the grating 1 with the difference that the information carrier plane 19 is designed as a reflective layer.

The pencil 5 of rays which is generated by the light source 4 is focused by the focusing means 6 onto the information carrier plane 19, from where it is reflected and directed by a beam splitter 22 onto the detector element 23 of the scanner 2. The output signal of the detector element 23 is indicated in an amplitude-against-time illustration in the window 25 in a manner corresponding to FIG. 1. It serves as input signal of the second control device 12. The control devices 11, 12 and the tilting-compensation device 7 correspond to those described with reference to FIG. 1. The recording medium 21 is shown sectionally; it corresponds to a compact disc CD which is held by a positioning device 24 formed from disc turntable 17 and puck 18. In order to remove the recording medium 21 from the apparatus, the puck 18 is raised, as is illustrated by broken lines.

The compensation of tilting in the exemplary embodiment in accordance with FIG. 2 is advantageously effected after the recording medium 21 has been inserted into the apparatus, and actually before the read-out. In this case, too, the light source 4 is switched on and the focusing means 6 is made to effect a back and forth movement along the optical axis 8. Using the signal output by the detector element 23, the second control device 12 changes the tilting of the focusing means 6, by means of the tilting-compensation device 7, until the modulation amplitude A is at a maximum. The pencil 5 of rays is subsequently focused onto the information carrier plane 19, a focus regulating circuit is closed, and then a track regulating circuit is closed, by means of which the focal point of the pencil 5 of rays follows the information tracks situated on the recording medium 21. The detector element 23 is designed in a known manner for this purpose. By way of example, it has a four-quadrant detector and, if appropriate, further detector elements. What is advantageous about the exemplary embodiment of FIG. 2 is, inter alia, that the compensation of tilting is carried out before the focus or track regulating circuit is closed. The focus or track regulating circuit can be closed particularly reliably and rapidly if the compensation of tilting has already been carried out in an optimum manner. The apparatus according to the invention is thus able to begin reading from and/or writing to the recording medium 21 particularly rapidly and reliably.

FIG. 3 diagrammatically illustrates a recording medium 21 in plan view, an optical grating 1 with a grating constant d, a second optical grating 1' with a grating constant d' and a two-dimensional optical grating 1". The recording medium 21 is designed as a circular disc with a central hole 26. Spirally or concentrically arranged information tracks 27 are represented diagrammatically on a greatly enlarged scale for part of the recording medium 21. The line B—B indicates the section of the recording medium 21 that is illustrated in FIG. 2. The spacing of the information tracks 27 from one another corresponds to the spacing of the grating lines 28 of the grating 1. This spacing corresponds to the grating constant d. In the case of the customary recording media used, for example the compact disc CD, or in the case of recording media having a higher recording density, such as the so-called DVD, the spacing of the information tracks 27 is so small that they appear virtually parallel in a small detail illuminated by the pencil 5 of rays. The grating lines 28 are therefore likewise arranged parallel. Grating 1' has a grating constant d' which is smaller than that of grating 1 and corresponds to a recording medium with a correspondingly smaller spacing of the information tracks. The grating 1" is a two-dimensional grating, that is to say it has two groups of grating lines 28, 28' arranged at an angle, in this case at a right angle, relative to one another. Such a grating 1" enables even tilting components whose influence becomes apparent perpendicularly to the lines 28, and cannot therefore be detected by a single grating 1, 1', to be made detectable without rotation of the grating. A two-dimensional grating 1" can also be designed as a hologram; the structure represented in FIG. 3 serves here principally for illustration purposes. In the case of a two-dimensional grating 1", it is likewise advantageously possible to arrange the lines such that they run outwards in the radial direction. It is likewise advantageously possible to use gratings with arcuately curved lines, which preferably have an average radius occurring in the case of a recording medium.

The grating constant d is determined as a function of the wavelength $\lambda$ of the light generated by the light source 4 and of the numerical aperture NA of the focusing means 6, preferably according to the formula $d=k*\lambda/NA$, where the proportionality factor k is in the range $k=1.2 \pm 10\%$. The wavelength $\lambda$ and the numerical aperture NA are, inter alia, also optimized to the spacing of the information tracks 27 from one another and the width thereof, so that there is also a direct correlation between the spacing of the information tracks 27 and the suitable grating constant d.

In another embodiment (not represented here) of the invention, the grating is fixed to the disc turntable 17 or to the puck 18. In this case, in order to carry out the compensation of tilting, the scanner 2 is moved radially inwards in such a way that the pencil 5 of rays detects the grating. In this case, the grating is preferably designed to be reflective, so that the detector 23 of the scanner 2 is used.

FIG. 4 shows a flow chart of a method according to the invention. In step a), the optical grating 1 or the recording medium 21 is introduced into the beam path which follows the optical element, the focusing means 6 in the exemplary embodiment. In the subsequent step b), the light source 4 is activated. In step c), the focal point of the pencil 5 of rays is varied in such a way that it is located alternately on one side and on the other side of the grating plane 9 or of the information carrier plane 19. This movement is also maintained during the following steps. Subsequently, step d) sees the beginning of the detection of the intensity of the light coming from the grating 1 or from the recording medium 21 by means of the detector element 13 or 23. Step e) sees the beginning of the measurement of the contrast between minima and maxima of the intensity, that is to say the beginning of the determination of the modulation amplitude A.

The following step f) is composed of the sub-steps f01), in which the tilting of the optical element 6 is varied by means of the tilting device 7, and the step f02), in which a check is made to see whether the modulation amplitude A has reached a maximum value. If this is not the case, the step f01) is repeated. Otherwise, step f) is concluded and, in step g), the focal point variation begun in step c), the detection begun in step d) and the contrast determination begun in step e) are ended and the tilting set in step f) is maintained. This tilting is either maintained permanently, for example if the setting of the tilting involves that setting which is carried out during the production of the apparatus, or it is maintained until the next time that the compensation of tilting is carried out, if the said compensation involves an operation that is carried out more or less regularly.

Supplementary method steps are illustrated by broken lines in FIG. 4. In step b1), which consists of two sub-steps b11) and b12), the grating 1 is oriented in the normal plane to the desired direction of the optical axis 8. In step b11), the orientation is changed; in step b12), a check is made to see whether the changed orientation is correct. If this is not the case, step b11) is repeated, otherwise the method branches to the following step.

A further additional method step b2) consists in the variation of the position of the grating 1 in the grating plane in a direction crossing the grating lines 28. This is effected by switching on the drive device 16 in the exemplary embodiment in accordance with FIG. 1. The variation of the position of the grating 1 is expediently ended in step g). If a recording medium 21 is used as grating, it is appropriate in this case to cause the disc turntable 17 to rotate, as a result of which a customary eccentricity of the information tracks 27 relative to the axis of rotation of the recording medium 21 likewise ensures that the information tracks 27 are displaced, or oscillate, in the radial direction.

According to a further variant of the method according to the invention, after step f), in step f1) the grating 1 is rotated about an axis lying parallel to the optical axis 8, and then in step f2) the tilting of the optical element 6 is varied perpendicularly to the tilting direction varied in step f) until the modulation amplitude A reaches a maximum. Steps f21) and f22) correspond to steps f01) and f02) except for the direction of the variation. If a two-dimensional grating 1" is used, the rotation is effected in step f1) by an angle whose value lies between 0° and 90°. Step f2) then merely involves monitoring whether the tilting setting that has been found is already the optimum setting.

In the case of the apparatus according to the invention, therefore, compensation of tilting is detected on the basis of the contrast of a pencil 5 of rays which passes through a grating 1 situated at the position of focus. This contrast, the modulation amplitude A, greatly depends on the tilting of the focusing means 6 or other optical elements situated in the beam path, with the result that, by maximizing the contrast, the tilting will be corrected to zero. Only the light source 4 and an actuator for varying the focal point have to be operationally available for this. In the arrangement according to the invention, the modulation amplitude A detected by the detector element 13, 23 greatly depends on the size of the focal point on the grating plane 9. The modulation amplitude A is maximized by changing the tilting of the focusing means 6. The direction of the tilting which is compensated for in this case is perpendicular to that of the grating lines 28 of the grating 1. For optimum correction of tilting, therefore, either the grating 1 is rotated in a second step or a two-dimensional grating 1" is used from the outset.

What is claimed is:

1. An apparatus for reading from or for writing to optical recording media comprising an optical scanner comprising:

a light source for generating a light pencil;

focusing means for focusing the light pencil;

a tilting-detection device for detecting tilt; and a tilting-compensation device for compensating tilt, wherein the tilting-detection device comprises an optical grating for influencing the light pencil, a detector element for detecting the influenced light pencil, a first control device for controlling the light source and the focusing means and a second control device for controlling the tilting-compensation device in response to an output signal of the detector element, wherein a grating constant d of the optical grating is related to a wavelength $\lambda$ of the light source and numerical aperture NA by the relationship $d = k \cdot \lambda / NA$, where the proportionality factor k assumes the value $k = 1.2 \pm 10\%$.

2. The apparatus according to claim 1, further comprising a positioning unit for positioning the optical grating parallel to a reference area of the apparatus.

3. The apparatus according to claim 2, further comprising a drive device for moving the optical grating parallel to the reference area of the apparatus.

4. The apparatus according to claim 3, wherein the optical grating has optical properties corresponding to optical properties of the optical recording medium.

5. The apparatus according to claim 4, wherein the optical grating is a two-dimensional grating.

6. The apparatus according to claim 1, further comprising a drive device for moving the optical grating parallel to a reference area of the apparatus.

7. The apparatus according to claim 1, wherein the optical grating is a two-dimensional grating.

8. In an apparatus for reading from or for writing to optical recording media, a method for compensating for the tilting of an optical element, comprising the steps of:

introducing an optical grating into a beam path following the optical element, activating a light source, varying a focal point of the beam path on the grating in a direction non-parallel to a grating plane, detecting intensity of the light coming from the grating, determining a contrast between minima and maxima of the detected intensity, varying the tilting of the optical element until the contrast is at a maximum, and maintaining the set tilting associated with the maximum contrast.

9. The method according to claim 8, further comprising the step of:

orienting the grating in a normal plane to the desired direction of the optical axis.

10. The method according to claim 9, characterized by the following additional step:

varying the position of the grating in the grating plane in a direction crossing the grating lines.

11. The method according to claim 10, further comprising the steps of:

rotating the grating with the optical axis as axis of rotation, varying the tilting of the optical element until the contrast is at a maximum.

12. The method according to claim 9, further comprising the steps of:

rotating the grating with the optical axis as axis of rotation, varying the tilting of the optical element until the contrast is at a maximum.

13. The method according to claim 8, further comprising the step of:

varying the position of the grating in the grating plane in a direction crossing the grating lines.

14. The method according to claim 8, further comprising the steps of:

rotating the grating with the optical axis as axis of rotation, varying the tilting of the optical element until the contrast is at a maximum.

* * * * *